(No Model.)
O. CAROTHERS.
WHEEL HUB.
No. 566,964. Patented Sept. 1, 1896.
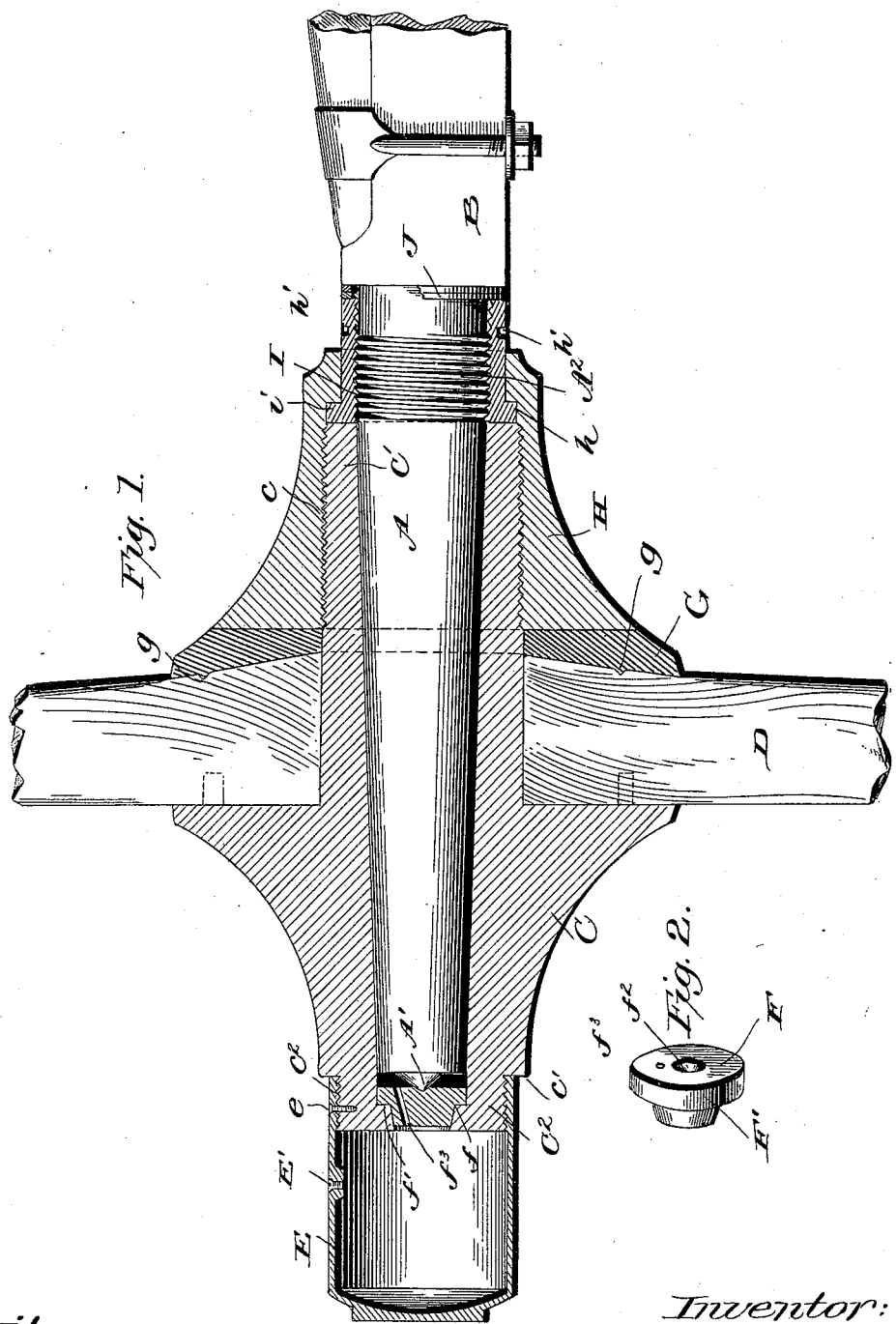
Witnesses:
L. C. Hills.
E. H. Bond
Inventor:
Oliver Carothers,
by E. B. Stocking
Attorney.
THE NORRIS PETERS CO., PHOTO-LITHO., WASHINGTON, D. C.

UNITED STATES PATENT OFFICE.

OLIVER CAROTHERS, OF ORBISONIA, PENNSYLVANIA.

WHEEL-HUB.

SPECIFICATION forming part of Letters Patent No. 566,964, dated September 1, 1896.

Application filed November 16, 1895. Serial No. 569,187. (No model.)

*To all whom it may concern:*

Be it known that I, OLIVER CAROTHERS, a citizen of the United States, residing at Orbisonia, in the county of Huntingdon, State of Pennsylvania, have invented certain new and useful Improvements in Wheel-Hubs, of which the following is a specification, reference being had therein to the accompanying drawings.

This invention relates to certain new and useful improvements in wheel-hubs; and it has for its object among others to provide a dust-proof self-oiling and point-bearing hub, the wheel being held by a nut at the inner end of the hub, thus allowing the outer end of said hub to be inclosed and providing a space for an oil-cup, also permitting the outer end of the spindle to be free from the nut, and also permitting of its being pointed to make a point-bearing, thereby greatly reducing the friction. The rear end or inside of the hub and spindle when fitted up tight will admit no mud or dust to the spindle, and thus keep the same clean and free from grit, and also serving to hold the oil. The wheel need not be taken off to be oiled.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a longitudinal section through a hub embodying my invention with the spindle shown in side elevation. Fig. 2 is a perspective view of the point-bearing for the spindle removed.

Like letters of reference indicate like parts in both of the views.

Referring now to the details of the drawings by letter, A designates the spindle, and B the axle.

C is the hub of the wheel, and D the spokes of known construction. The hub has a tubular extension C', tapered to conform to the taper of the spindle and screw-threaded at its inner end, as seen at $c$. At its outer end it is formed with a shoulder $c'$, the reduced portion $C^2$ thus formed being exteriorly threaded, as seen at $c^2$, upon which is threaded the sand band or cap E, forming a reservoir for the reception of oil, the said receptacle being adapted to be filled through an opening, which in this instance is shown as closed by a screw, although, of course, as will be evident, other means may be employed as a stopper. The band E may be further retained in position by a screw or screws $e$ engaging the reduced portion $C^2$ of the hub, if desired. The outer end of the hub is formed with a recess or socket $f$, into which is fitted the point-bearing F, of brass or other suitable materal, having an annular flange F' engaging the shoulder $f'$ of the socket of the hub to prevent endwise movement thereof, the said bearing F being formed upon its inner face with a conical hole $f^2$ to receive the conical point A' of the outer end of the spindle, as shown. This point-bearing F has an oil-passage $f^3$, through which the oil from the oil box or receptacle may pass to lubricate the spindle.

G is a washer sleeved upon the tubular portion of the hub and having spurs or ribs or the like $g$ to be embedded in the spokes, as seen in Fig. 1, and H is a nut internally threaded to engage the threads $c$ on the extension C' of the hub and adapted to bear against the washer G. The end of this nut nearest the axle is formed with an annular recess or shoulder $h$, as seen in Fig. 1, in which engages the annular flange $i$ of the nut I, which is internally threaded to engage the exterior threads $A^2$ on the spindle, the said nut being provided with the depressions $h'$ or analogous means for engaging a wrench, whereby the same may be turned.

J are washers between the end of the nut H and the shoulder of the axle to allow for wear.

What I claim as new is—

1. The combination with the hub having a central socket at its outer end, of a point-bearing seated in said socket, and a spindle having a point at its outer end engaging a depression in said bearing, and a cap on the end of the hub extended beyond said bearing substantially as specified.

2. The combination with the hub having a central socket at its outer end, of a point-bearing seated in said socket, a spindle having a point at its outer end engaging a depression in said bearing, said bearing having an oil-passage, and a cap on the outer end of the hub having a filling-aperture and consituting an oil-receptacle, substantially as specified.

3. The combination with the hub having a tubular exteriorly-threaded extension, of the spindle in said extension and having screw-threads between said extension and the shoulder on the axle, a nut engaging the threads on the spindle, and a nut engaging the threads on the extension and having a socket to receive the flange on the nut which engages the spindle, a tapered socket with a shoulder at the opposite end of the hub, a conical point-bearing seated in said socket and having a flange to engage said shoulder, and a depression to receive a point on the outer end of the spindle, said bearing being formed, also, with an inclined passage therethrough, and a cap on the outer end of the hub substantially as specified.

4. The combination with the hub having a tubular exteriorly-threaded extension, of the spindle in said extension and having screw-threads between said extension and the shoulder on the axle, a nut engaging the threads on the spindle, and a nut engaging the threads on the extension and having a socket to receive the flange on the nut which engages the spindle, and a washer interposed between the exterior nut and the spokes, substantially as specified.

In testimony whereof I affix my signature in presence of two witnesses.

OLIVER CAROTHERS.

Witnesses:
C. B. BUSH,
J. R. WILSON.